(12) United States Patent
Minear et al.

(10) Patent No.: US 7,113,776 B2
(45) Date of Patent: Sep. 26, 2006

(54) SYSTEM AND METHOD FOR APPLICATION AND APPLICATION METADATA FILTERING BASED ON WIRELESS DEVICE CAPABILITIES

(75) Inventors: Brian Minear, San Diego, CA (US); Eric John Lekven, Carlsbad, CA (US); Mitchell B. Oliver, San Diego, CA (US); Phil Nguyen, San Diego, CA (US); Richard Wayne Gardner, III, Solana Beach, CA (US); Stephen A. Sprigg, Poway, CA (US)

(73) Assignee: Qualcomm Inc., San Diego, CA (US)

( * ) Notice: Subject to any disclaimer, the term of this patent is extended or adjusted under 35 U.S.C. 154(b) by 216 days.

(21) Appl. No.: 10/232,911

(22) Filed: Aug. 30, 2002

(65) Prior Publication Data

US 2004/0043763 A1 Mar. 4, 2004

(51) Int. Cl.
*H04M 3/00* (2006.01)
*G06F 15/16* (2006.01)

(52) U.S. Cl. .................... 455/419; 455/420; 709/219
(58) Field of Classification Search ........ 455/418–420, 455/435.1, 414.1–414.4; 709/203, 217, 227, 709/229, 219; 713/1, 2
See application file for complete search history.

(56) References Cited

U.S. PATENT DOCUMENTS

| 5,867,781 A | * | 2/1999 | Hofmann ............ 455/419 |
| 5,924,026 A | * | 7/1999 | Krishnan .............. 455/414.1 |
| 6,006,091 A | * | 12/1999 | Lupien ................ 455/435.1 |
| 6,029,065 A | * | 2/2000 | Shah .................. 455/414.4 |
| 6,035,339 A | * | 3/2000 | Agraharam et al. ...... 709/246 |
| 6,104,924 A | * | 8/2000 | Shirai ................ 455/418 |
| 6,167,441 A | * | 12/2000 | Himmel ............... 709/217 |
| 6,223,028 B1 | * | 4/2001 | Chang et al. .......... 455/419 |
| 6,275,692 B1 | * | 8/2001 | Skog ................. 455/414.3 |
| 6,363,249 B1 | * | 3/2002 | Nordeman et al. ...... 455/418 |
| 6,542,740 B1 | * | 4/2003 | Olgaard et al. ........ 455/432.1 |
| 6,795,704 B1 | * | 9/2004 | Hardin ............... 455/432.3 |
| 6,807,415 B1 | * | 10/2004 | Sato ................. 455/420 |
| 6,816,895 B1 | * | 11/2004 | Andreakis et al. ...... 709/219 |
| 2002/0002605 A1 | * | 1/2002 | Honda ............... 709/219 |
| 2002/0016817 A1 | * | 2/2002 | Offer ................ 709/203 |
| 2003/0074453 A1 | * | 4/2003 | Ikonen ............... 709/228 |
| 2003/0121983 A1 | * | 7/2003 | Herle ................ 235/472.01 |
| 2004/0002943 A1 | * | 1/2004 | Merrill et al. ......... 707/1 |
| 2004/0098669 A1 | * | 5/2004 | Sauvage et al. ........ 715/513 |

FOREIGN PATENT DOCUMENTS

| EP | 1168758 | 6/2001 |
| GB | 2346716 | 8/2000 |
| WO | WO0036803 | 6/2000 |

* cited by examiner

*Primary Examiner*—Charles N. Appiah
(74) *Attorney, Agent, or Firm*—Philip R. Wadsworth; Robert J. O'Connell

(57) ABSTRACT

A system, method, and computer program for delivering services to wireless communication devices. The system tailors the services based on the capability of the wireless device and the services subscribed by the user. A server or other computer device receives from the wireless device capability data, or "flags," indicating the capability of the device to access data or download and receive applications provided over the network.

40 Claims, 6 Drawing Sheets

SYSTEM AND METHOD FOR APPLICATION AND APPLICATION METADATA FILTERING BASED ON WIRELESS DEVICE CAPABILITIES

BACKGROUND OF THE INVENTION

I. Field of the Invention

This invention generally relates to wireless communications. More specifically, the present invention relates to data communication between remote computer devices across a wireless network.

II. Description of the Related Art

Wireless communications technology evolves rapidly. Not long ago, when wireless communication devices, such as mobile telephones, first appeared on the market, they all used analog technology. One analog technology used is Advanced Mobile Phone Service (AMPS). Initially, communication between a wireless handset and a base station (BS) is based on frequency division multiplex access (FDMA) technology, and the number of particular users in a communication cell is limited by the number of available channels. Now, the same communication can use different technologies, such as time division multiplex access (TDMA), code division multiplex access (CDMA), or global system for mobile communications (GSM). The analog technology is in many places being replaced by digital technology. The wireless devices therefore communication voice and data in packets across the digital network.

With increasing number of users using wireless communications, the number of different types of wireless devices has also increased substantially. Now there are hundreds of models of mobile telephone devices available on the market, and some of the telecommunication service providers even offer their own private models. Currently little information is passed between a wireless device and a cellular base station, often solely enough information to synchronize the necessary timing signals for data packet communication. And in many instances, the wireless device is nothing more than a display device that receives instructions from the base station. With introduction of more modern wireless devices that are equipped with advanced capabilities, there is increasing need for the service providers to learn more about the capabilities of the wireless devices used by their subscribers in order to deliver better services.

Accordingly, it would be advantageous to provide a system and method for wireless service providers to learn about the capabilities of the wireless devices that interact with the base stations. Such system and method should provide adequate capability data to the service provider, yet not interfere with wireless device functionality or increase manufacturing complexity of the device. It is thus to such a system and method for communication wireless device capabilities that the present invention is primarily directed.

SUMMARY OF THE INVENTION

The present invention is a system, method, and computer program for delivering services to wireless communication devices based upon the capability of the wireless device and the services subscribed by the user. In the system, at least one wireless device is in selective communication with the application download server, and the wireless device selectively attempts to access one or more applications across the wireless network, and the application can be resident on that application download server or upon another computer device on the wireless network. The wireless device includes a computer platform and one or more resident software applications, and selectively communicates wireless device capability data to the application download server, and the application download server selectively determines access to or download of one or more applications based upon the wireless device capability data of the wireless device attempting access. The system can accordingly customize the applications, data, graphics, and the like, that are sent to the wireless device with the knowledge that the device will have the requisite capability to execute the data.

The method for customizing software applications available to a wireless device across a wireless network includes the steps of generating wireless device capability data at the wireless device, attempting to access one or more applications from the wireless device across the wireless network, transmitting the wireless device capability data from the wireless device to an application download server, and determining access of the wireless device to the one or more applications based upon the wireless device capability data, for such purposes a download, execution, and display. The wireless device capability data can be capability flags sent from the wireless device at initial contact with the application download server, or can occur when the wireless device seeks to access or download specific applications or data.

The present invention therefore advantageously provides a system and method for wireless service providers to learn about the capabilities of the wireless devices that interact with the servers and selectively download applications and data therefrom. The system and method thus insures that the applications and data made available to the wireless device computer platform will be compatible. Moreover, the wireless device capability data can be communicated without increasing the overhead to the wireless device operation.

Other objects, advantages, and features of the present invention will become apparent after review of the hereinafter set forth Brief Description of the Drawings, Detailed Description of the Invention, and the Claims.

DETAILED DESCRIPTION OF THE INVENTION

Figure 1:
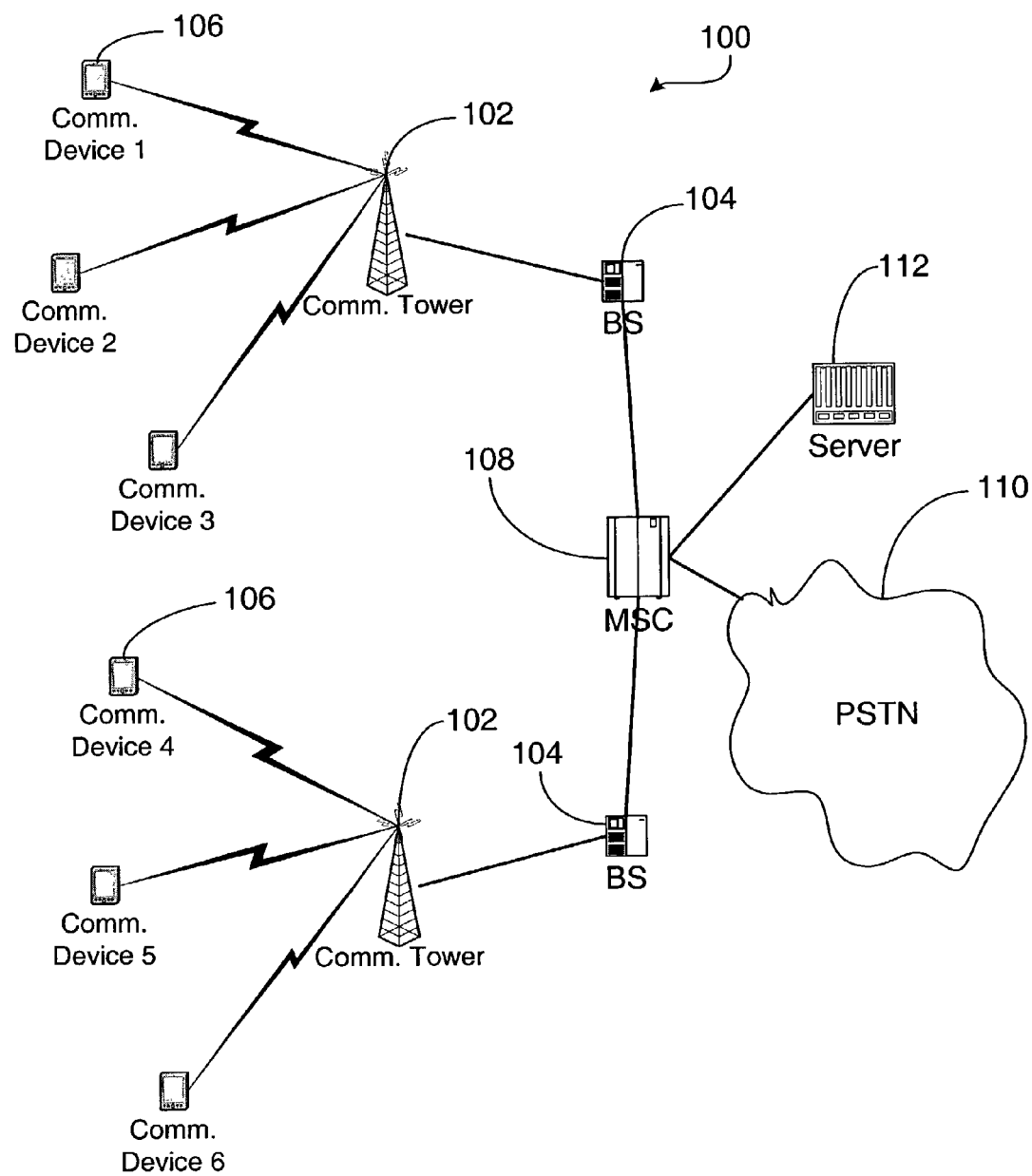
FIG. 1 is a pictorial view of an architecture of a wireless communications network.

In this description, the terms "communication device," "wireless device," "hand held telephone," and "handset" are used interchangeably; and the term "application" is meant to encompass any discrete segment of software, such as data, executables, graphics, menus, libraries, and the like. FIG. 1 depicts a communication network 100 used according to the present invention. The communication network 100 includes a wireless communications network, a public switched telephone network (PSTN) 110, and the Internet 120. Wireless devices, such as cellular telephones, pagers, personal digital assistants (PDAs), and other computer devices with wireless connectivity, themselves have increased their capabilities such they have a computer platform and a runtime environment to run different vendor provided software. Besides receiving electronic mails, paging messages, and voice mails at the wireless device, the user can also browse the Internet and download applications and data from application download servers accessible either from the cell itself, another wireless device within the cell, or through an Internet connection.

An end-user of the wireless device can thus enjoy a multiplicity of services provided by his wireless service provider by subscribing to different services offered by the service provider. For certain services, the user may only be able to access particular applications if the wireless device has the capability to receive those services. For example, to browse the Internet, wireless device must have some type of browser to view web pages.

When implemented in a cellular telecommunication environment, the wireless communication network includes a plurality of communication towers 102, each connected to a base station (BS) 104 and serving users with communication devices 106. The communication devices (handsets) 106 can be cellular telephones, pagers, PDAs, laptop computers, or other hand-held, stationary, or portable communication device that uses a wireless and cellular telecommunication network. The commands and data input by each user are transmitted as digital data to a communication tower 102. The communication between a user using a communication device 106 and the communication tower 102 can be based on different technologies, such code division multiplexed access (CDMA), time division multiplexed access (TDMA), frequency division multiplexed access (FDMA), global system for mobile communications (GSM), or other protocols that may be used in a wireless communications network or a data communications network. The data from each user is sent from the communication tower 102 to a base station (BS) 104, and forwarded to a mobile switching center (MSC) 108, which may be connected to a public switched telephone network (PSTN) 110.

The user can use his communication device 106 to establish a voice communication with a telephone set connected to the PSTN 110 or to another handset 106 in the wireless network. The user may also request a special application or feature from the MSC 108.

Figure 2:
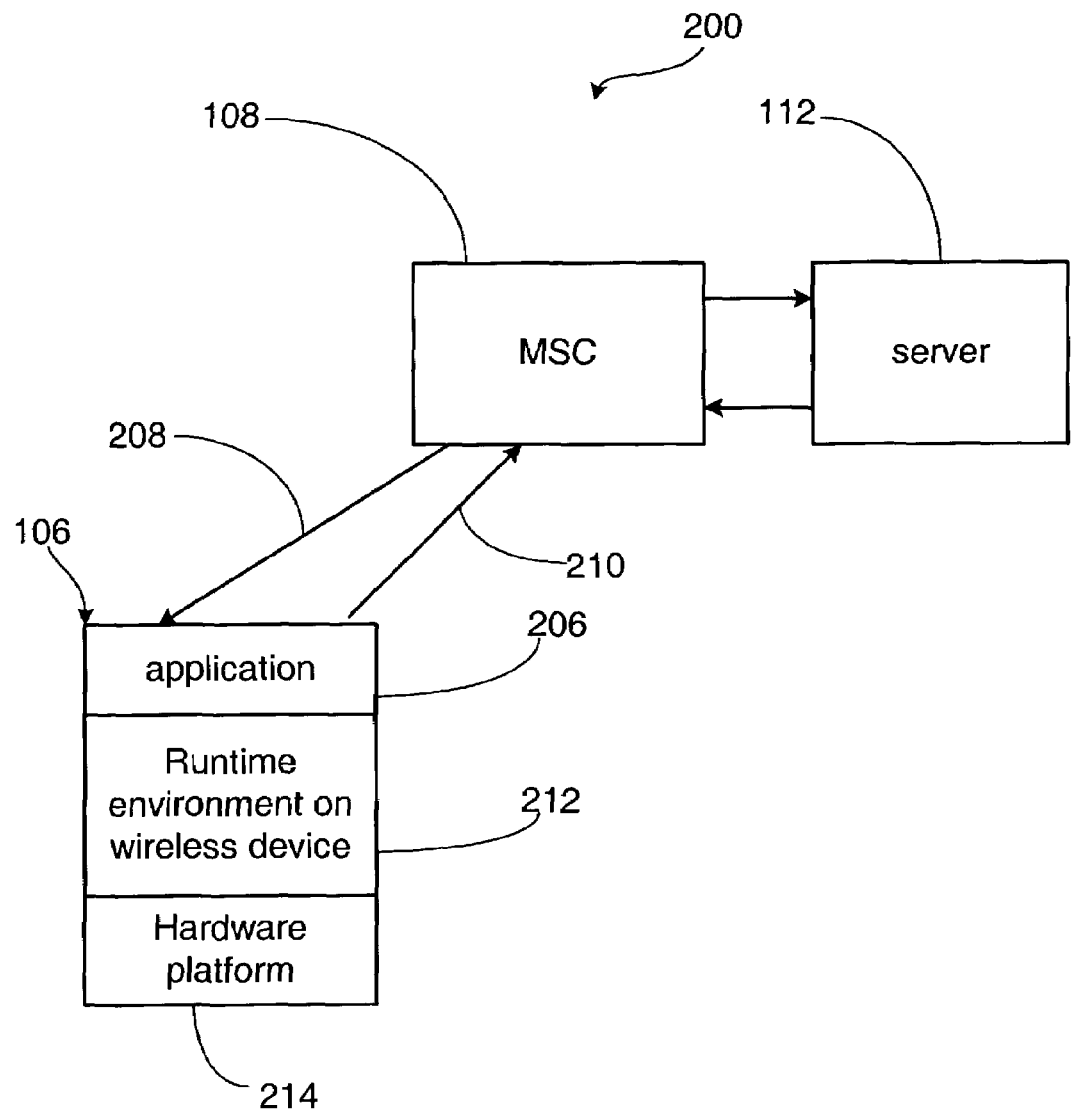
FIG. 2 is a block diagram illustrating an architecture of a system with a wireless device including a runtime environment.

FIG. 2 illustrates an architecture 200 for communication between the MSC 108 and a communication device 106. The MSC 108 is connected to a server 112 where special applications may be stored. The communication device 106 includes a hardware platform 214 and a runtime environment 212 running on this hardware platform 214. The runtime environment 212 is a layer of executing software similar to an operating system that commands the physical hardware elements of the wireless device. The existence of the runtime environment 212 makes easier for development of other software applications 206, and makes it possible for a communication device 106 to support a variety of user applications 206.

A communication device 106 with the runtime environment 212 may download special applications 206 from the MSC 108 and these applications 206 are run locally on the communication device 106 itself. The special applications 206 may be a web browser, a video game, a multi-user game, etc. Each application 206 can be tailored for the specific hardware platform.

The communication device 106 communicates with the MSC 108 via an uplink 210 and a downlink 208. In one embodiment, there are a voice channel and a control channel established on each link during a voice communication between the communication device 106 and another handset. The MSC 108 has access to at least one application download server 112 where applications 206 and data can be stored. The MSC 108 thus receives a communication attempt or a request for applications 206 from the uplink 210 and dispatches applications 206 via the downlink 208 to the communication device 106. Because of the desire to ensure access to applications 206 that are executable or permissible to the wireless device, the wireless device communicates capability data to the server 112 so the proper access to applications resident on that server 112, or on another computer device of the wireless network that server 112 can control access to.

Figure 3:
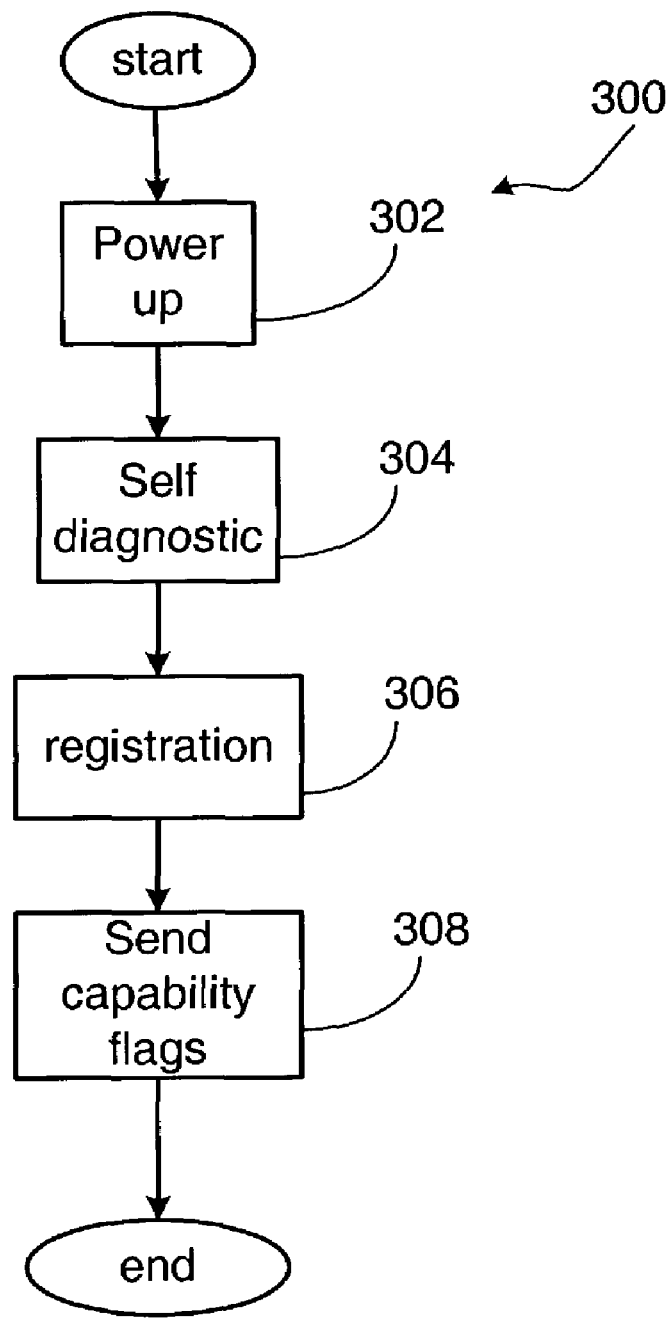
FIG. 3 is a flowchart for a power up process for a wireless device.

FIG. 3 is a block diagram 300 of one embodiment of a registration process for a communication device 106. After powering up, step 302, the communication device 106 performs a self-diagnostic, shown at step 304, and sends a registration request 306 to the service provider serving the region. As part of the registration procedure, the communication device 106 also sends the capability data as a string of capability flags, shown at step 308, to the MSC 108. The capability flags can describe the hardware device, the runtime environment, and/or end-user information to the MSC 108. The capability flags can be set at manufacturer, while others may be set by the end-users or service providers. For example, the flag indicating the hardware model or other information about the computer platform can be set when the communication device 106 is manufactured. The flag indicating the release version of the runtime environment can be set by the manufacturers initially, and can be changed when a newer version of the runtime environment is installed on the wireless communication device 106. The wireless service provider can set flags that reflect the type of services or the pricing plan the user subscribes, the age of the end-user, or any other metadata filtering of the wireless device capability in order to determine application access.

Figure 4:
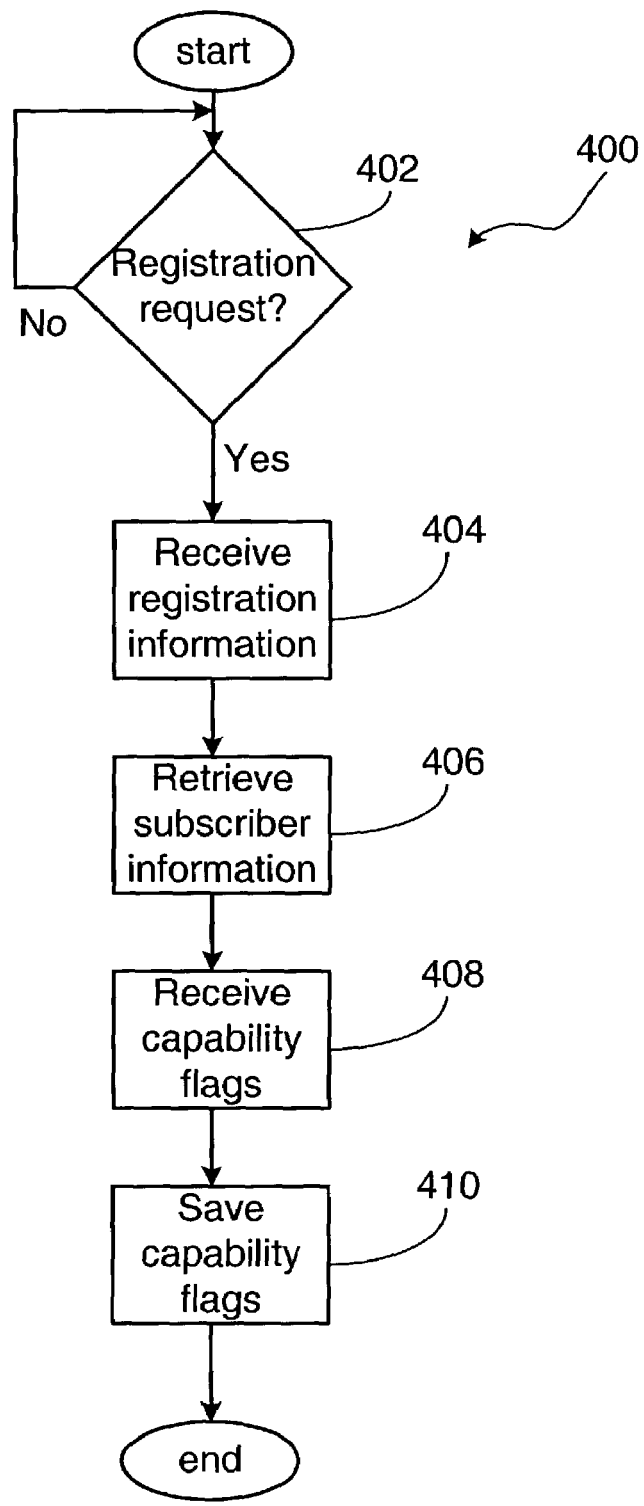
FIG. 4 is a flowchart for a registration process at a MSC.

FIG. 4 is a flowchart 400 for a registration procedure at a MSC 108. The MSC 108 checks for registration request, shown at step 402, continuously. When a registration request is received, the MSC receives the registration information, shown at step 404. The registration information can include the mobile identification number (MIN) and electronic identification number (EIN). After receiving subscriber information, the MSC retrieves and verifies the subscriber information as shown at step 406. If the user is roaming away from his home network, his subscriber information may be retrieved from his home location register and maintained in the visitor location register (VLR). The information retrieved from the HLR generally determines services available to the end-user.

However, the services available to the user can be further modified according to the physical capability of the communication device used by the user. The information about the communication device is passed to the MSC through the capability flags, shown at step 408, and the capability flags are saved by the MSC, shown at step 410.

Figure 5:
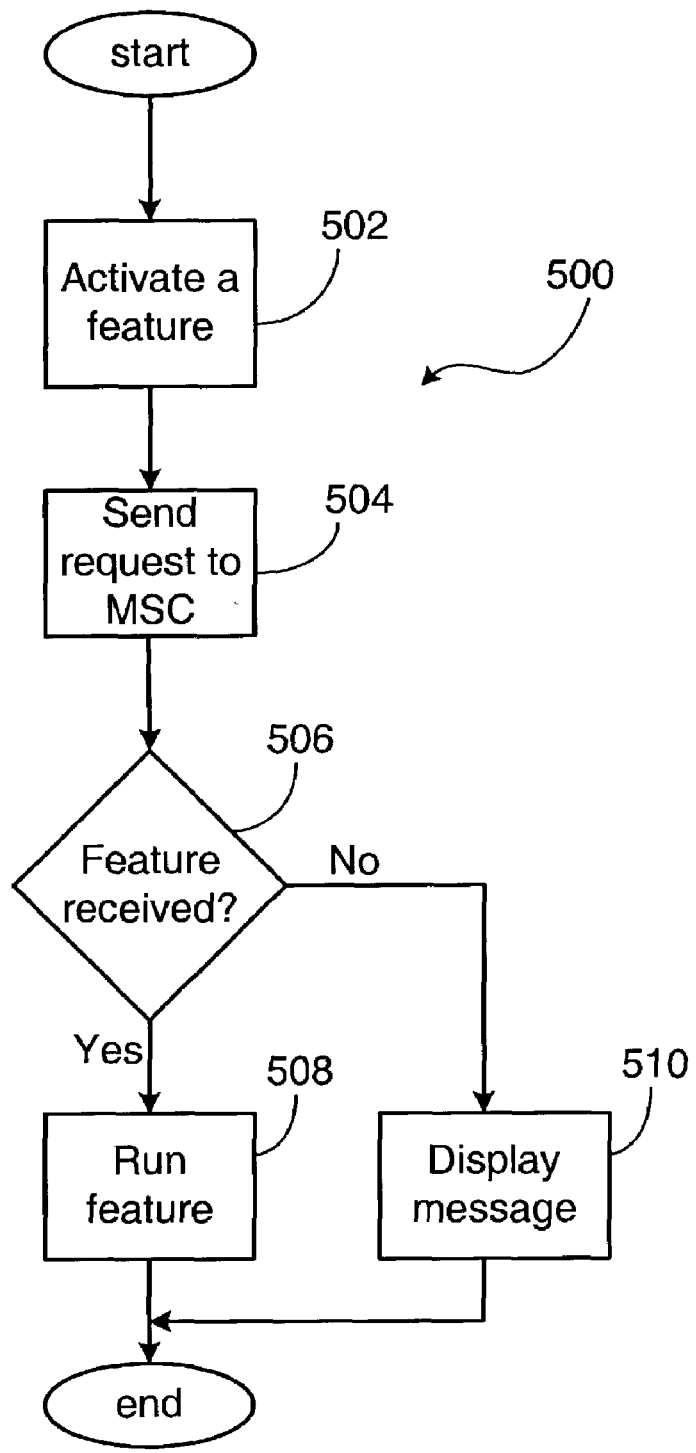
FIG. 5 is a flowchart for a feature activation process of the wireless device.

FIG. 5 is a flowchart 500 for an activation request process at a wireless communication device 106. The user activates a feature, shown at step 502, and the communication device sends the request to the MSC, step 504. After sending the request, the communication device checks whether the software for the feature has been received, shown at step 506. If the feature has been received, the communication device runs the feature, shown at step 508, and if the feature has not been received, the communication device displays a message to the user, shown at step 510.

With the communication device's increasing computing capability and increasing wireless transmission bandwidth, it is often more efficient to run a feature on the wireless communication device 106 itself, instead of running on a server connected to the MSC. When a feature is run on the server, the wireless communication device 106 performs basic function of input and output devices. However, for a feature to run locally on a communication device, the feature software must be compatible with the communication device, and the MSC must to know what type of communication device the user is using.

Figure 6:
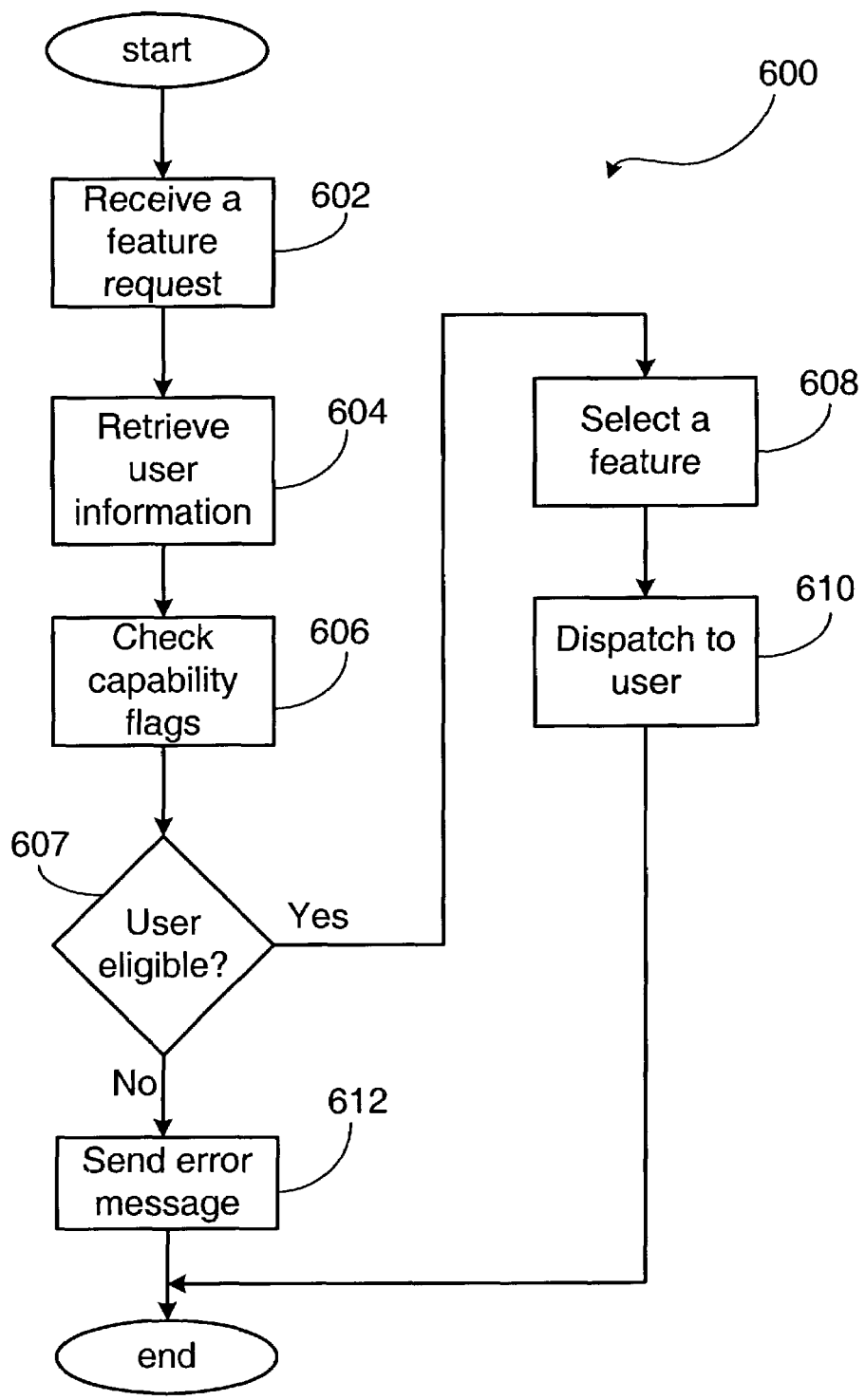
FIG. 6 is a flowchart for a process executing on a MSC checking a feature activation request.

FIG. 6 is a flowchart 600 illustrating one embodiment of a request process in a MSC. After receiving a request from the communication device, shown at step 602, the MSC retrieves the user information, shown at step 604. The MSC checks the capability flags, shown at step 606, and compares the capability flags with the requirements for the requested feature to determine if download to the wireless communication device 106 is advisable. The MSC can also check whether the user has subscribed to the requested feature at this step. If the user is eligible to receive the requested feature, then the MSC selects a version of the feature or application that is compatible with his communication device, shown at step 608. After selecting the proper version of the application, the MSC dispatches the feature application to the user, shown at step 610, such as a menu, graphics display, or application version. If the user is not eligible to receive the feature, an error message is sent to the user, as shown at step 612.

In operation, the end-user using a communication device 106 that has a factory built in runtime environment may upgrade the runtime environment by downloading it from the service provider. After the upgrading the runtime environment to a newer version, the communication device 106 updates its internal flag to reflect the new version of the runtime environment. The service provider (MSC) can also update its memory to reflect the new version of the runtime environment in parallel to the update at the wireless communication device 106. Alternately, the service provider can download subscriber information to the communication device 106 by setting the proper flags to reflect the subscription information. By storing subscriber information in the communication device 106, roaming may be made simpler since the servicing wireless service provider can retrieve less information from the HLR.

In another embodiment, for a subscriber who has many communication devices 106 under a single service plan, such as in a family plan, the subscriber can designate special features for the different communication devices. For example, the subscriber can prevent a communication device 106 designated for use by a minor from accessing adult material.

In a further embodiment, when a subscriber is roaming away from the subscriber's home coverage area, as the powers up his communication device, the communication device first performs self diagnostic, and then registers itself with a local wireless service provider. When registering with the wireless service provider (MSC), the communication device sends capability data, such as a string of flags, to the wireless service provider. The flags indicate to the wireless service provider the information about the hardware, the version of runtime environment, and the user information. The flags can then be used by the wireless service provider to filter the software to provide to the communication device 106 beginning at the initial interaction with the cell.

The wireless device capability data can also be retransmitted from the server 112 to other computer devices on the wireless network as necessary. For example, the end-user can request a multi-user interactive game from the wireless service provider including information about a desired opponent. Before checking the opponent is available and willing to participate, the wireless service provider checks whether the user is eligible to play this game, i.e. the wireless service provider checks the information from the flags to verify the user has subscribed to the game and the user is authorized to play the game. Then the wireless device can relay any capability data of available opponents should the end-user be benefited by such knowledge.

For example, if the end-user's communication device 106 is running on a faster device than that of the opponent, the server 112 can relay the capability data to indicate so. Or, if the opponent prefers another language, then the wireless service provider can indicate that any dialogue will be translated and consequently, may not occasionally translate well in the end-user's language.

It can thus be seen that the system provides a method for customizing software applications available to a wireless device 106 across a wireless network through the steps of generating wireless device capability data at a wireless device 106, the wireless device 106 including a computer platform 214 and one or more resident software applications, and attempting to access one or more applications from the wireless device across the wireless network, then transmitting the wireless device capability data from the wireless device 106 to an application download server, such as server 112, and then determining access of the wireless device 106 to the one or more applications based upon the wireless device capability data. The method can further include the step of downloading the one or more applications to the computer platform 214 of the wireless device 106.

The step of generating wireless device capability data can be generating one or more flags on the wireless device 106, transmitting at least subscriber information, transmitting at least information about the computer platform 214 of the wireless device 106, or transmitting at least information about the software resident on the computer platform 214 of the wireless device 106. Further, the step of attempting to access one or more applications across the wireless network can be attempting to access one or more applications resident on the application download server, such as server 112, or attempting to access one or more applications resident on a first application download server on the wireless network. If the step is accessing a first application download server, then the step of transmitting the wireless device capability data is transmitting the wireless device capability data to a second computer device on the wireless network, and the step of determining access of the wireless device 106 to the one or more applications is determining access of the wireless device 106 to the one or more applications at the second computer device based upon the wireless device capability data.

In view of the method being executable on the computer platform of a computing device such as server 112, the present invention includes a program resident in a computer readable medium, where the program directs a server or other computing devices having a computer platform to perform the steps of the method. The computer readable medium can be the memory of the server 112, the memory of the wireless device 106, or can be in a connective database. Further, the computer readable medium can be in a secondary storage media that is loadable onto a wireless device computer platform, such as a magnetic disk or tape, optical disk, hard disk, flash memory, or other storage media as is known in the art.

In the context of FIGS. 3–6, the method may be implemented, for example, by operating portion(s) of the wireless network to execute a sequence of machine-readable instructions, such the server 112. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated.

What is claimed is:

1. A system for interfacing with a communication device in a wireless communications environment, comprising:
    at least one application download server in a wireless network; and
    at least one wireless device in selective communication with the application download server, the wireless device selectively attempting to access one or more applications across the wireless network, the wireless device including a computer platform and one or more resident software applications;
    wherein
        the wireless device selectively communicates wireless device capability data to the application download server, and
        the application download server selectively determines access to one or more applications based upon the wireless device capability data of the wireless device attempting access, the wireless device capability data including information sufficient to identify an application execution runtime environment supported by the wireless device.

2. The system of claim 1, wherein the wireless device capability data comprises one or more flags transmitted from the wireless communication device, and the application download server using the one or more flags to select applications to be made available for access by the wireless communication device.

3. The system of claim 1, wherein the wireless device capability data provides subscriber information.

4. The system of claim 1, wherein the wireless device capability data provides information about the computer platform of the wireless device.

5. The system of claim 1, wherein wireless device capability data provides information about the software resident on the computer platform of the wireless device.

6. The system of claim 1, wherein the one or more applications attempted to be accessed by the wireless device are resident on the application download server.

7. The system of claim 1, wherein the one or more applications attempted to be accessed by the wireless device are resident on another computer device on the wireless network, and the application download server selectively determines access to the one or more applications resident on the other computer device based upon the wireless device capability data of the wireless device attempting access received at the application download server.

8. A system for interfacing with a communication device in a wireless communications environment, comprising:
    at least one application download means for downloading one or more applications across a wireless network;
    at least one wireless communication means for selectively attempting to access one or more applications across the wireless network; and
    wherein the wireless communication means selectively communicating capability data to the application download means, and the application download means selectively determining access to one or more applications based upon the capability data, the capability data including information sufficient to identify an application execution runtime environment supported by the wireless communication means.

9. A method for customizing software applications available to a wireless device across a wireless network, comprising the steps of:
    generating wireless device capability data at a wireless device, the wireless device including a computer platform and one or more resident software applications, the wireless device capability data including information sufficient to identify an application execution runtime environment supported by the wireless device;
    attempting to access one or more applications from the wireless device across the wireless network;
    transmitting the wireless device capability data from the wireless device to an application download server; and
    determining access of the wireless device to the one or more applications based upon the wireless device capability data.

10. The method of claim 9, further comprising the step of downloading the one or more applications to the computer platform of the wireless device.

11. The method of claim 9, wherein the step of generating wireless device capability data is generating one or more flags on the wireless device.

12. The method of claim 9, wherein the step of transmitting the wireless device capability data is transmitting at least subscriber information.

13. he method of claim 9, wherein the step of transmitting the wireless device capability data is transmitting at least information about the computer platform of the wireless device.

14. The method of claim 9, wherein the step of transmitting the wireless device capability data is transmitting at least information about the software resident on the computer platform of the wireless device.

15. The method of claim 9, wherein the step of attempting to access one or more applications across the wireless network is attempting to access one or more applications resident on the application download server.

16. The method of claim 9, wherein:
    the step of attempting to access one or more applications across the wireless network is attempting to access one or more applications resident on a first application download sewer on the wireless network;

the step of transmitting the wireless device capability data is transmitting the wireless device capability data to a second computer device on the wireless network; and the step of determining access of the wireless device to the one or more applications is determining access of the wireless device to the one or more applications at the second computer device based upon the wireless device capability data.

17. A method for providing software applications to a wireless device across a wireless network, comprising the steps of:

a data generation step for generating wireless device capability data at a wireless device, the wireless device including a computer platform and one or more resident software applications, the wireless device capability data including information sufficient to identify an application execution runtime environment supported by the wireless device;

an access step for accessing one or more applications by the wireless device across the wireless network;

a transmission step for transmitting wireless device capability data from a wireless device to an application download server; and an access determination step for determining access of the wireless device to access the one or more applications based upon the wireless device capability data.

18. A wireless device in selective communication with an application download server across a wireless network and selectively attempting to access one or more applications at the application download server, the wireless device comprising:

a computer platform; and at least one resident software application;

wherein the wireless device selectively communicating wireless device capability data to the application download server, the wireless device capability data including information sufficient to identify an application execution runtime environment supported by the wireless device.

19. The device of claim 18, wherein the wireless device capability data comprises one or more flags transmitted from the wireless communication device.

20. The device of claim 18, wherein the wireless device capability data provides subscriber information.

21. The device of claim 18, wherein the wireless device capability data provides information about the computer platform of the wireless device.

22. The device of claim 18, wherein wireless device capability data provides information about the software resident on the computer platform of the wireless device.

23. The device of claim 18, wherein the device communicates wireless device capability data at the time of attempting to access an application download server.

24. The device of claim 18, wherein the device communicates wireless device capability data at the time of attempting to access an application resident at an application download server.

25. A computer readable medium storing a computer program that, when executed, causes a wireless computer device comprising a computer platform and one or more resident software applications to perform the steps of:

generating wireless device capability data, the wireless device capability data including information sufficient to identify an application execution runtime environment supported by the wireless device;

attempting to access one or more applications across a wireless network at an application download server; and transmitting the wireless device capability data from the wireless device to the application download server.

26. The computer readable medium of claim 25, wherein the program further causes the device to perform the step of downloading the one or more applications to the computer platform of the wireless device.

27. The computer readable medium of claim 25, wherein the program causes the step of generating wireless device capability data to be generating one or more flags on the wireless device.

28. The computer readable medium of claim 25, wherein the program causes the step of transmitting the wireless device capability data to be transmitting at least subscriber information.

29. The computer readable medium of claim 25, wherein the program causes the step of transmitting the wireless device capability data to be transmitting at least information about the software resident on the computer platform of the wireless device.

30. The computer readable medium of claim 25, wherein the program causes the step of transmitting the wireless device capability data to be transmitting at least information about the software resident on the computer platform of the wireless device.

31. The computer readable medium of claim 25, wherein the program causes the step of transmitting the wireless device capability data to be transmitting the wireless device capability data from the wireless device to the application download server at the step of attempting to access the one or more applications.

32. The computer readable medium of claim 25, wherein the program causes the step of transmitting the wireless device capability data to be transmitting the wireless device capability data from the wireless device to the application download server at the step of attempting to download an application.

33. A computer readable medium storing a computer program that, when executed, causes a computer device that provides access to one or more applications to wireless devices across a wireless network to perform the steps of:

receiving an access attempting of one or more applications from a wireless device across the wireless network;

receiving wireless device capability data from the wireless device, the wireless device capability data including information sufficient to identify an application execution runtime environment supported by the wireless device; and determining access of the wireless device to the one or more applications based upon the wireless device capability data.

34. The computer readable medium of claim 33, wherein the program further directs the device to perform the step of transmitting the one or more applications to the wireless device.

35. The computer readable medium of claim 33, wherein the program causes the step of receiving wireless device capability data to be receiving flags from the wireless device.

36. The computer readable medium of claim 33, wherein the program causes the step of determining access of the wireless device to the one or more applications based upon the wireless device capability data to be determining access based upon at least subscriber information.

37. The computer readable medium of claim 33, wherein the program causes the step of determining access of the wireless device to the one or more applications based upon the wireless device capability data to be determining access based upon at least information about the computer platform of the wireless device.

38. The computer readable medium of claim 33, wherein the program causes the step of determining access of the wireless device to the one or more applications based upon the wireless device capability data to be determining access based upon at least information about the software resident on the computer platform of the wireless device.

39. The computer readable medium of claim 34, wherein the program causes the step of transmitting the one or more applications to the wireless device to be transmitting to the wireless device one or more applications resident on that computer device.

40. The computer readable medium of claim 34, wherein the program causes the step of transmitting the one or more applications to the wireless device to be transmitting to the wireless device one or more applications resident on another computer device on the wireless network.

* * * * *

(12) EX PARTE REEXAMINATION CERTIFICATE (7031st)
United States Patent
Minear et al.

(10) Number: US 7,113,776 C1
(45) Certificate Issued: Aug. 25, 2009

(54) SYSTEM AND METHOD FOR APPLICATION AND APPLICATION METADATA FILTERING BASED ON WIRELESS DEVICE CAPABILITIES

(75) Inventors: Brian Minear, San Diego, CA (US); Eric John Lekven, Carlsbad, CA (US); Mitchell B. Oliver, San Diego, CA (US); Phil Nguyen, San Diego, CA (US); Richard Wayne Gardner, III, Solana Beach, CA (US); Stephen A. Sprigg, Poway, CA (US)

(73) Assignee: Qualcomm Incorporated, San Diego, CA (US)

Reexamination Request:
No. 90/008,818, Aug. 15, 2007

Reexamination Certificate for:
Patent No.: 7,113,776
Issued: Sep. 26, 2006
Appl. No.: 10/232,911
Filed: Aug. 30, 2002

(51) Int. Cl.
*H04M 3/00* (2006.01)
*G06F 15/16* (2006.01)

(52) U.S. Cl. .................... 455/419; 455/420; 709/219
(58) Field of Classification Search .................. None
See application file for complete search history.

(56) References Cited

U.S. PATENT DOCUMENTS

| 6,006,251 | A | 12/1999 | Toyouchi et al. |
| 6,047,051 | A | 4/2000 | Ginzboorg et al. |
| 6,360,077 | B2 | 3/2002 | Mizoguchi |
| 6,687,901 | B1 | 2/2004 | Imamatsu |
| 7,113,776 | B2 | 9/2006 | Minear et al. |

FOREIGN PATENT DOCUMENTS

| EP | 1 128 691 A2 | 8/2001 |
| GB | 2369701 | 6/2002 |
| JP | 2001078258 | 3/2001 |
| RU | 16965 | 2/2001 |
| WO | 98038820 | 9/1998 |
| WO | 02003732 | 1/2002 |

OTHER PUBLICATIONS

Topley, Kim; "J2ME in a Nutshell", Mar. 20, 2002, selected excerpts from Overview, Preface, Contents, and Chapter 1, 2, and 3.*
International Preliminary Examination Report—PCT/US03/026896, IPEA/US, Apr. 1, 2005.
Definition of runtime environment at http://www.pcmag.com/encyclopedia_term/0,2542,t=runtime+envionment&i=50732,00.asp.
Definition of runtime environment at http://www.techterms.com/definition/rte.
Flanagan, David, "Java in a Nutshell, A Desktop Quick Reference" Fourth Edition, O'Reilly, Mar. 2002, p. 5–6.
Sun Microsystems, Mobile Information Device Profile (JSR–37), JCP Specification, Java 2 Platform, Micro Edition, 1.0, Sep. 1, 2000.
3GPP TS 23.057 V4.0.0 (2000–12), "3rd Generation Partnership Project; Technical Specification Group Terminals; Mobile Station Application Execution Environment (MExE);Functional Description; Stage 2," (Release 4).
Sun Microsystems, "Over The Air User Initiated Provisioning Recommended Practice for the Mobile Information Device Profile," Version 1.0, May 7, 2001.

* cited by examiner

*Primary Examiner*—Mary Steelman

(57) ABSTRACT

A system, method, and computer program for delivering services to wireless communication devices. The system tailors the services based on the capability of the wireless device and the services subscribed by the user. A server or other computer device receives from the wireless device capability data, or "flags," indicating the capability of the device to access data or download and receive applications provided over the network.

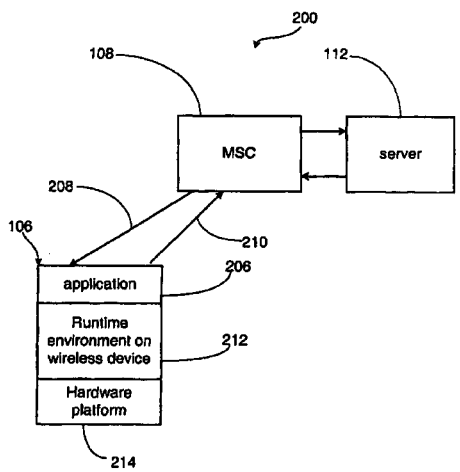

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4, 5, 8–10, 13, 14, 17, 18, 21, 22, 25, 26, 29, 30, 33, 37 and 38 are determined to be patentable as amended.

Claims 2, 3, 6, 7, 11, 12, 15, 16, 19, 20, 23, 24, 27, 28, 31, 32, 34–36, 39, and 40, dependent on an amended claim, are determined to be patentable.

1. A system for interfacing with a communication device in a wireless communications environment, comprising:
   at least one application download server in a wireless network; and
   at least one wireless device in selective communication with the application download server, the wireless device selectively attempting to access one or more applications across the wireless network, the wireless device including a [computer] *hardware* platform, *an application execution runtime environment configured to directly command the physical hardware elements of the hardware platform*, and one or more resident software applications;
   wherein
      the wireless device selectively communicates wireless device capability data to the application download server, and
      the application download server selectively determines access to one or more applications *that are configured to be executed in the application execution runtime environment of the hardware platform* based upon the wireless device capability data of the wireless device attempting access, the wireless device capability data including information sufficient to identify [an] *the* application execution runtime environment [supported by] *of the hardware platform of* the wireless device.

4. The system of claim 1, wherein the wireless device capability data provides information about the [computer] *hardware* platform of the wireless device.

5. The system of claim 1, wherein wireless device capability data provides information about the software resident on the [computer] *hardware* platform form of the wireless device.

8. A system for interfacing with a communication device in a wireless communications environment, comprising:
   at least one applicaton download means for downloading one or more applications across a wireless network;
   at least one wireless communication means for selectively attempting to access one or more applications across the wireless network, *the at least one wireless communication means including a computer platform and an application execution runtime environment configured to directly command the physical hardware elements of the hardware platform*; and
   wherein the wireless communication means selectively communicating capability data to the application download means, and the application download means selectively determining access to one or more applications *that are configured to be executed in the application execution runtime environment* based upon the capability data, the capability data including information sufficient to identify [an] *the* application execution runtime environment [supported by] *of* the wireless communication means.

9. A method for customizing software applications available to a wireless device across a wireless network, comprising the steps of:
   generating wireless device capability data at a wireless device, the wireless device including a [computer] *hardware* platform, *an application execution runtime environment configured to directly command the physical elements of hardware platform*, and one or more resident software applications, the wireless device capability data including information sufficient to identify [an] *the* application execution runtime environment [supported by] *of the hardware platform of* the wireless device;
   attempting to access one or more applications from the wireless device across the wireless network, *the one or more applications configured to be executed in the application execution runtime environment*;
   transmitting the wireless device capability data from the wireless device to an application download server; and
   determining access of the wireless device to the one or more applications based upon the wireless device capability data.

10. The method of claim 9, further comprising the step of downloading the one or more applications to the [computer platform of the] wireless device.

13. [he] *The* method of claim 9, wherein the step of transmitting the wireless device capability data is transmitting at least information about the [computer] *hardware* platform of the wireless device.

14. The method of claim 9, wherein the step of transmitting the wireless device capability is transmitting at least information about the software resident on the [computer] *hardware* platform of the wireless device.

17. A method for providing software applications to a wireless device across a wireless network, comprising the steps of:
   a data generation step for generating wireless device capability data at a wireless device, the wireless device including a [computer] *hardware* platform, *an application execution runtime environment configured to directly command the physical elements of the hardware platform*, and ore or more resident software applications, the wireless device capability data including information sufficient to identify [an] *the* application execution runtime environment [supported by] *of* the wireless device;
   an access step for accessing one or more applications by the wireless device across the wireless network, *the one or more applications configured to be executed in the application execution runtime environment*;
   a transmission step for transmitting wireless device capability data from a wireless device to an application download server; and
   an access determination step for determining access of the wireless device to access the one or more applications based upon the wireless device capability data.

18. A wireless device in selective communication with an application download server across a wireless network and selectively attempting to access one or more applications at the application download server, *the one or more applications configured to be executed in an application execution runtime environment*, the wireless device comprising:

a [computer] *hardware* platform;

*the application execution runtime environment configured to directly command the physical elements of the hardware platform;* and at least one resident software application;

wherein the wireless device selectively communicating wireless device capability data to the application download server, the wireless device capability data including information sufficient to identify [an] *the* application execution runtime environment [supported by] *of* the wireless device.

21. The device of claim 18, wherein the wireless device capability data provides information about the [computer] *hardware* platform of the wireless device.

22. The device of claim 18, wherein wireless device capability data provides information about the software resident on the [computer] *hardware* platform of the wireless device.

25. A computer readable medium storing a computer program that, when executed, causes a wireless computer device comprising a [computer] *hardware* platform and one or more resident software applications to perform the steps of:

generating wireless device capability data, the wireless device capability data including information sufficient to identify an application execution runtime environment [supported by] *, the application execution runtime environment configured to directly command the physical elements of the hardware platform of* the wireless device;

attempting to access one or more applications across a wireless network at an application download server, *the one or more applications configured to be executed in the application execution runtime environment*; and transmitting the wireless device capability data from the wireless device to the application download server.

26. The computer readable medium of claim 25, wherein the program further causes the device to perform the step of downloading the one or more applications to the [computer platform of the] wireless device.

29. The computer readable medium of claim 25, wherein the program causes the step of transmitting the wireless device capability data to be transmitting at least information about the software resident on the [computer] *hardware* platform of the wireless device.

30. The computer readable medium of claim 25, wherein the program causes the step of transmitting the wireless device capability data to be transmitting at least information about the software resident on the [computer] *hardware* platform of the wireless device.

33. A computer readable medium storing a computer program that, when executed, causes a computer device that provides access to one or more applications to wireless devices across a wireless network to perform the steps of:

receiving an access attempting of one or more applications from a wireless device across the wireless network, *the one or more applications configured to be executed in an application execution runtime environment of the wireless device, the application execution runtime environment configured to directly command the physical elements of the hardware platform of the wireless device*;

receiving wireless device capability data from the wireless device, the wireless device capability data including information sufficient to identify [an] *the* application execution runtime environment [supported by] *of* the wireless device; and determining access of the wireless device to the one or more applications based upon the wireless device capability data.

37. The computer readable medium of claim 33, wherein the program causes the step of determining access of the wireless device to the one or more applications based upon the wireless device capability data to be determining access based upon at least information about the [computer] *hardware* platform of the wireless device.

38. The computer readable medium of claim 33, wherein the program causes the step of determining access of the wireless device to the one or more applications based upon the wireless device capability data to be determining access based upon at least information about the software resident on the [computer] *hardware* platform of the wireless device.

* * * * *